(12) United States Patent
Ray et al.

(10) Patent No.: US 7,669,142 B2
(45) Date of Patent: Feb. 23, 2010

(54) VIEWABLE AND ACTIONABLE SEARCH RESULTS

(75) Inventors: Ethan Ray, Redmond, WA (US); Rodney C. Edwards, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 517 days.

(21) Appl. No.: 11/276,452

(22) Filed: Feb. 28, 2006

(65) Prior Publication Data

US 2007/0204232 A1 Aug. 30, 2007

(51) Int. Cl.
  *G06F 17/00* (2006.01)
  *G06F 3/048* (2006.01)

(52) U.S. Cl. .............. 715/825; 715/254; 715/779; 715/810; 715/811; 715/845

(58) Field of Classification Search .......... 715/845, 715/254, 825, 811, 779
See application file for complete search history.

(56) References Cited

U.S. PATENT DOCUMENTS

| | | | |
|---|---|---|---|
| 6,434,556 B1 * | 8/2002 | Levin et al. .............. 707/5 |
| 6,553,373 B2 * | 4/2003 | Boguraev et al. ........... 707/5 |
| 6,670,968 B1 * | 12/2003 | Schilit et al. ............. 715/760 |
| 6,785,670 B1 * | 8/2004 | Chiang et al. ............. 707/3 |
| 6,845,484 B1 * | 1/2005 | Kraft et al. .............. 715/206 |
| 7,047,502 B2 * | 5/2006 | Petropoulos et al. ....... 715/781 |
| 7,103,853 B1 * | 9/2006 | Patil .................... 715/824 |
| 7,240,290 B2 * | 7/2007 | Melideo ................. 715/764 |
| 2006/0031214 A1 * | 2/2006 | Solaro et al. ............ 707/4 |
| 2006/0085280 A1 * | 4/2006 | Murnan et al. ........... 705/26 |
| 2006/0085741 A1 * | 4/2006 | Weiner et al. ........... 715/517 |
| 2006/0179039 A1 * | 8/2006 | Murarka et al. .......... 707/3 |
| 2006/0248061 A1 * | 11/2006 | Kulakow et al. .......... 707/3 |
| 2006/0265417 A1 * | 11/2006 | Amato et al. ............ 707/102 |
| 2006/0277167 A1 * | 12/2006 | Gross et al. ............. 707/3 |
| 2006/0287985 A1 * | 12/2006 | Castro et al. ............ 707/3 |
| 2006/0294476 A1 * | 12/2006 | Buckley ................. 715/781 |
| 2007/0043721 A1 * | 2/2007 | Ghemawat et al. ........ 707/7 |
| 2007/0226192 A1 * | 9/2007 | Vaca et al. ............... 707/3 |

OTHER PUBLICATIONS

Sherman Chris, Yahoo Launches Desktop Search, Jan. 11, 2005, SearchEngineWatch.com, retrieved Mar. 26, 2009.*

* cited by examiner

*Primary Examiner*—Tadesse Hailu
*Assistant Examiner*—Nicholas S Ulrich
(74) *Attorney, Agent, or Firm*—Lee & Hayes, PLLC (57) ABSTRACT

Search results can be viewed and acted upon. Searches may be conducted using a search input in conjunction with a selected category. The search results may be produced from such a search. One or more of the produced search results may be highlighted for previewing. Along with the preview, available actions are presented that are based on the selected category. A user can initiate an action of the available actions. The initiated action is then performed with respect to the highlighted search result(s).

27 Claims, 9 Drawing Sheets

VIEWABLE AND ACTIONABLE SEARCH RESULTS

BACKGROUND

The internet contains a wealth of information. In fact, the types of information are so varied and the amount of information is so great that it is difficult to find information without using some kind of search tool. Search tools are powered by search engines that may operate differently. For example, searches may be based on key word search targets. The returned search results often differ from one search engine to another depending on the mechanism employed to crawl the internet and to index the information that is encountered during the crawling.

Regardless of the underlying search engine that is used, search results are usually returned by search engines in a listing format. To peruse the search results, a user clicks on each individual search result that appears to be promising. If the user determines that the search result is ultimately not relevant, the user returns (e.g., backs up) to the search results and clicks on another promising individual search result. The process continues until a helpful search result is actually discovered.

SUMMARY

Search results can be viewed and acted upon. Searches may be conducted using a search input in conjunction with a selected category. The search results may be produced from such a search. One or more of the produced search results may be highlighted for previewing. Along with the preview, available actions are presented that are based on the selected category. A user can initiate an action of the available actions. The initiated action is then performed with respect to the highlighted search result(s).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

As described above, search results are usually returned by search engines in a listing format. To peruse the search results, a user clicks on each individual search result that appears to be promising. The search result is then displayed in a different browser window or in place of the search result listing. If the user determines that the search result is actually not relevant, the user returns (e.g., backs up) to the browser window with the search results listing and clicks on another promising individual search result. The process continues until a helpful search result is discovered.

Once a helpful search result is discovered, the user must open another window of a browser and/or of another application in order to perform some action on or with the helpful search result. For example, a messenger program or an email program must be launched to send or mail the search result to a buddy or other contact. At least another window must be opened to blog the search result. Furthermore, to search emails, an email program that is separate from a browser program must be launched. In short, the conventional search experience is separate from other services that may be utilized on a computer.

In contrast, certain described implementations for viewable and actionable search results integrate different services and a search function. For example, search results for the web, for emails, for shopping, for news, etc. may be displayed for the same search input merely be changing category. To view a given search result item, the corresponding search result may be highlighted in a search results listing. The given search result is then previewed. To facilitate performing some action with respect to the previewed search result, available actions that depend on a selected category are presented for the previewed search result. Thus, actions that pertain to web search results are presented for a previewed web search result item, actions that pertain to a mail search results are presented for a previewed mail search result item, and so forth.

Example Environments for Viewable and Actionable Search Results

Figure 1:
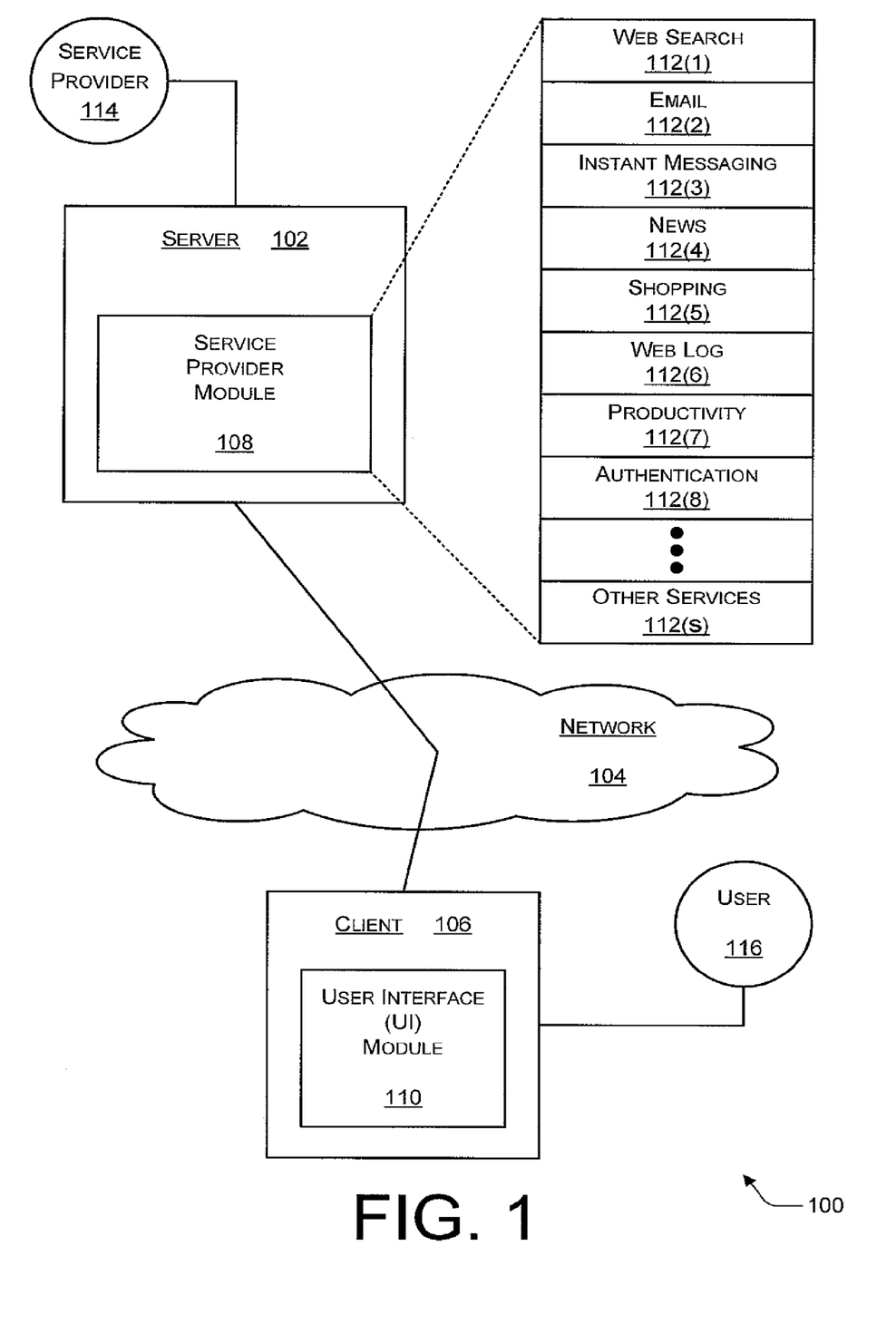
FIG. 1 is an example environment in which viewable and actionable search results may be implemented.

FIG. 1 is an example environment 100 in which viewable and actionable search results may be implemented. As illustrated, environment 100 includes a server 102, a network 104, and a client 106. Server 102 includes a service provider module 108. Client 106 includes a user interface (UI) module 110. Server 102 represents a service provider 114, and client 106 represents a user 116.

Although only a single server 102 and service provider 114 are explicitly illustrated in environment 100, multiple service providers 114 may exist, each with multiple servers 102.

Similarly, although only a single client 106 and user 116 are shown, there may be multiple such clients 106 and/or users 116 that are being served by one or more servers 102. Server 102 and client 106 include processing and media resources that are sufficient to perform their respect functions as described herein. Example device hardware, software, etc. for a server 102 and/or a client 106 are described herein below with particular reference to FIG. 9.

Server 102 and client 106 communicate over network 104. Network 104 may be any given network or combination of networks. Examples include, but are not limited to, the Internet, a telephone network, a cable network, a local or wide area network (LAN or WAN), a wireless or wired network, some combination thereof, and so forth. However, in a described implementation, network 104 comprises at least the internet, and more specifically, the world wide web (WWW) portion of the internet.

Service provider module 108 is capable of providing one or more services 112 over network 104. Examples of such services include, but are not limited to, web search 112(1), email 112(2), instant messaging (IM) 112(3), news 112(4), shopping 112(5), web log 112(6), productivity 112(7), authentication 112(8) . . . other services 112(s), and so forth. Web log services 112(6) may include those services that enable a user 116 to create a web log (or blog). Productivity services 112(7) may include applications such as word processing, spread sheets, financial planning and analysis, audio/visual presentation development, some combination thereof, and so forth.

Authentication services 112(8) may include services relating to proving that a person has certain access rights through, e.g., identification (ID) and password regimes. Other examples may include providing cryptographic services and/or evaluation of login ID and other identifying data (e.g., a finger print, an iris scan, etc.). Other services 112(s) represents other possible web-based services, such as those for entertainment, art, and so forth.

In a described implementation, service provider module 108, which executes on server 102, stores the data and performs the processing in order to provide services 112. Accordingly, client 106 can optionally be a relatively lightweight device with minimal processing and storage capabilities. UI module 110 executes on client 106 and presents a UI to user 116 on behalf of service provider module 108 in order to provide one or more services 112. The basics of an example UI are described below with particular reference to FIG. 2.

Although example implementations of viewable and actionable search results are described herein primarily in terms of a paradigm in which the server is responsible for the majority of the computing, viewable and actionable search results may be realized in alternative implementations. For example, client 106 may have significant processing, storage, and communications capabilities such that a server 102 is not involved, at least for services 112 that may be fully or partially self-hosted at client 106. For instance, client 106 may search stored emails and blogs without interaction across network 104. Cooperation, interaction, and division of computing responsibilities between server 102 and client 106 may also be realized anywhere along a continuum having one end in which server 102 is primarily responsible for the computing and having another end in which client 106 is primarily responsible for the computing.

Figure 2:
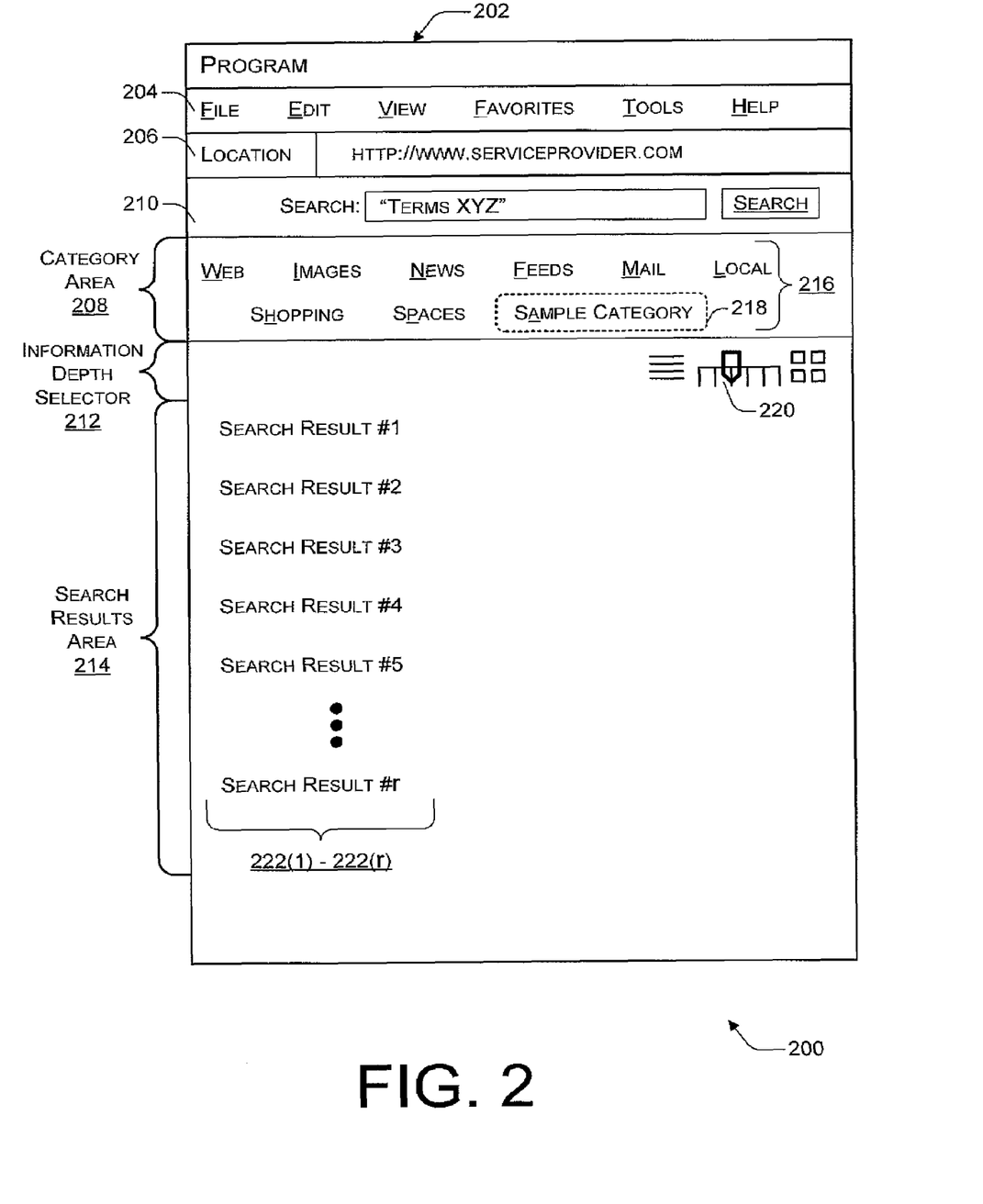
FIG. 2 is an example user interface having selectable categories in which search results may be viewed and with which search results may be interacted.

FIG. 2 is an example UI 200 having selectable categories 216 in which search results 222 may be viewed and with which search results 222 may be interacted. UI 200 includes a program window 202. Examples for the program include, but are note limited to, a browser program, a general communication program, a general user interface or shell program, an operating system (OS) program, a productivity program, some combination thereof, and so forth. Especially depending on the type of underlying program, the illustrated aspects of program window 202 may be rearranged, some of the illustrated aspects may not be included, and/or other aspects may be added. Regardless, UI module 110 may be part of such an underlying program.

As illustrated, program window 202 includes a top-level menu bar 204, a location indicator bar 206, a category area 208, a search input area 210, an information depth selector 212, and a search results area 214. The illustrated example menu components of the top-level menu bar 204 are: File, Edit, View, Favorites, Tools, and Help. However, more, fewer, or different menu components may alternatively be present on the top-level menu bar 204, especially depending on the underlying program. The location indicator bar 206, if included, has a dual purpose. First, it can be used to input a desired target location that is local or across a network. Second, it presents the location with which communication is currently established.

Category area 208 includes multiple categories 216. The illustrated example categories 216 are: web, images, news, feeds, mail, local, shopping, spaces, and sample category. Respective categories 216 may correspond to one or more services 112 (of FIG. 1). For example, web 216 may correspond to web search 112(1), mail 216 may correspond to email 112(2), shopping 216 may correspond to shopping 112(5), spaces 216 may correspond to web log 112(6), and so forth. Categories 216 may also be separate from services 112 that are provided by service provider module 108. For instance, category local 216 may be directed to information stored locally at client 106.

Categories 216 may be displayed as part of UI 200 in any of a variety of manners. They may simply be listed like the text of a menu bar. They may be represented as press-able buttons. They may be realized as tabs. Other manners may alternatively be implemented. Also, although categories 216 are illustrated as being represented by text, they may alternatively be represented by an icon (e.g., an envelope for mail, a bag for shopping, etc.) or by both text and an icon.

A category 216 of category area 208 may be selected as indicated by selection highlighting indicator 218. Although selection highlighting indicator 218 is shown as a ring formed from a dashed line, selection can be indicated in alternative manners. Example alternative selection highlighting indication manners include, but are not limited to, visual brightening, inverse video, changing a background color or hue, having a button look depressed, having a tab be moved to the top, adding a check mark, some combination thereof, and so forth.

Desired selection may be indicated by a user 116 in any of a variety of manners. First, selection may be indicated with keyboard commands (e.g., <Tab> key presses and then <Enter>). Second, selection may be indicated with letters representing particular categories 216 (e.g., by pressing the underlined letter along with the <Alt> key). Third, selection may be indicated with a pointer device (e.g., by moving a cursor icon in proximity to a desired category 216 and clicking). These selection indication mechanisms may be combined, and/or other alternatives may also be implemented.

Search input area 210 enables the input of search terms. As illustrated, it includes a box for search term input and a button to activate the search. The example search term input is "Terms XYZ". Search results area 214 includes the search results 222 of the search term input. Generally, search results area 214 includes "r" search results 222(1)-222(r), with "r" being some integer. Specifically, as illustrated, it includes search result #1 222(1), search result #2 222(2), search result

3 222(3), search result #4 222(4), search result #5 222(5)... search result #r 222(r). Although search results 222 are displayed vertically in UI 200, they may be displayed in an alternative arrangement. Examples of such alternative arrangements include, but are not limited to, multiple columns, one or more rows, a grid, and so forth.

Information depth selector 212 enables a user 116 to select the amount or depth of information that is displayed for each search result 222. As illustrated, information depth selector 212 is a slider bar 220. Slider bar 220 includes a pointer arrow that may be slid by a user to a number of different positions. Sliding the pointer arrow completely leftward causes search results 222 to be displayed in a relatively minimal format. Sliding the pointer arrow completely rightward causes search results 222 to be displayed in a relatively maximal format. There are intermediate positions in between the two. In an example implementation, the displayed search results 222 may be changed in response to sliding the pointer arrow without re-running the search (i.e., all of the data that would be displayed in a maximal format is initially retrieved but may not be initially displayed).

An example relatively minimal format may include the title of a corresponding search result item and an identifier (e.g., a network location) thereof. An example of a relatively maximal format may include for the corresponding search result item: the title, the network location, some initial text of the item, text around the words of the search terms, an image, and statistical information about the item. However, the maximal, the minimal, and the intermediate formats may include more, less, and/or different information.

Although information depth selector 212 is specifically illustrated as a slider bar 220, it may be realized with a different mechanism. For example, information depth selector 212 may be realized as a set of radio-style buttons. Also, a slider bar, a set of buttons, or another information depth selector mechanism may include detailed icons or text that describe or otherwise indicate the amount of information provided for each setting.

As illustrated, UI 200 presents category area 208 between search input area 210 and search results area 214 (e.g., below the former and above the latter). In a described implementation, category area 208 is presented after an input search term is entered, and a search is activated on the search term at search input area 210. However, category area 208 may alternatively also be presented prior to a search activation. Although category area 208 may be presented in a different location presenting it proximate to search results area 214 facilitates user access and interactivity when switching the selected category 216.

In a described implementation, the selected category 216, as visually represented by selection highlighter indicator 218, determines the context for a requested search. If the images category 216 is selected, the input search term "Terms XYZ" is applied to, for example, a database or index of data, that pertains to images. If the mail category 216 is selected, then the input search term "Terms XYZ" is applied to information pertaining to mail.

When a category selection is changed in category area 208, search results 222 that are displayed in search results area 214 are likewise changed. In other words, the output search results 222 for a search input of "Terms XYZ" are changed. For example, search results 222 from the images category 216 are replaced by search results 222 from the mail category 216 when selection highlighter indicator 218 is moved from "Images" to "Mail".

Example Implementations for Viewable and Actionable Search Results

Figure 3:
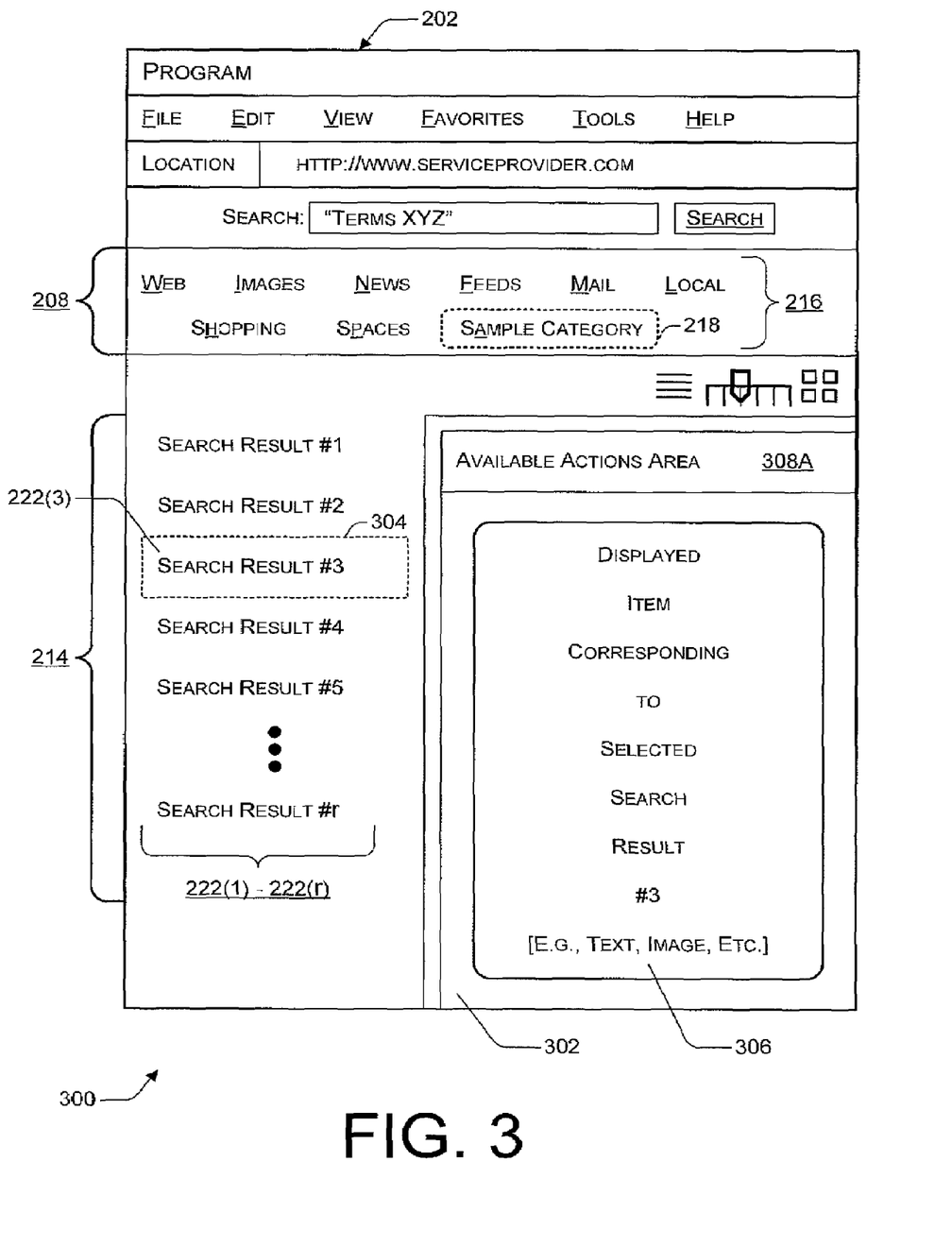
FIG. 3 is an example user interface in which a highlighted search result is previewed within a pane in proximity to available actions.

FIG. 3 is an example UI 300 in which a highlighted search result 222(3) is previewed within a pane 302 in proximity to available actions 308A. As illustrated, UI 300 displays search results #1-#r 222(1)-222(r). Search result 222(3) has been selected by a user 116 as indicated by selection highlighted indicator 304.

Selection of a search result 222 in search results area 214 may be effected in the same manners as, or in similar manners to, those described above with particular reference to FIG. 2 for selecting a category 216 from category area 208. Likewise, the highlighting of selection highlighted indicator 304 for a search result 222 may be realized in the same manners as or in similar manners to those described above for the highlighting of selection highlighted indicator 218 for a category 216.

In a described implementation, pane 302 enables selected search result(s) 222 to be previewed. Because search result #3 222(3) has been selected as represented by selection highlighted indicator 304, the item corresponding to the selected search result #3 is displayed at 306. The displayed item 306 may include text, images, video, some combination thereof, and so forth, depending on the selected category 216 as well as the content of the particular item 306.

Although less than all of the material of item 306 may be displayed, UI 300 displays as much of a full version of item 306 as is capable of being displayed in pane 302 as governed by space limitations. Pane 302 may be capable of being sized and/or scrolled. Sizing and/or scrolling the overall program window 202 may also change the amount of item 306 that is displayed within pane 302.

Pane 302 also includes an available actions area 308A. Available actions area 308A includes actions that are available to be initiated with respect to the previewed item 306 that corresponds to the selected search result #3 222(3). Available actions area 308A may be part of or merely proximate to pane 302. They may be present at all times when search functions are being utilized or when a particular search result 222 has been selected. Available actions area 308A may also be presented anywhere within program window 202 (including anywhere on a computing "desktop"), but proximity to pane 302 tends to provide context and user convenience.

In a described implementation, the actions that are made available in available actions area 308A are category-sensitive. In other words, the actions that a user 116 may initiate for a displayed preview item 306 depend on the category 216 that is selected as represented by selection highlighted indicator 218 in category area 208. Thus, a UI module 110, possibly in conjunction with a service provider module 108, presents available actions area 308A based on a selected category 216 of category area 208.

The available actions are actions that relate to items that would be found in a search with regard to the selected category. For example, available actions presented in available actions area 308A when the mail category 216 is selected relate to mail items actions, such as reply, forward, and so forth. Other example available actions for example categories 216 are described further herein below with particular reference to FIGS. 6 and 7.

Figure 4:
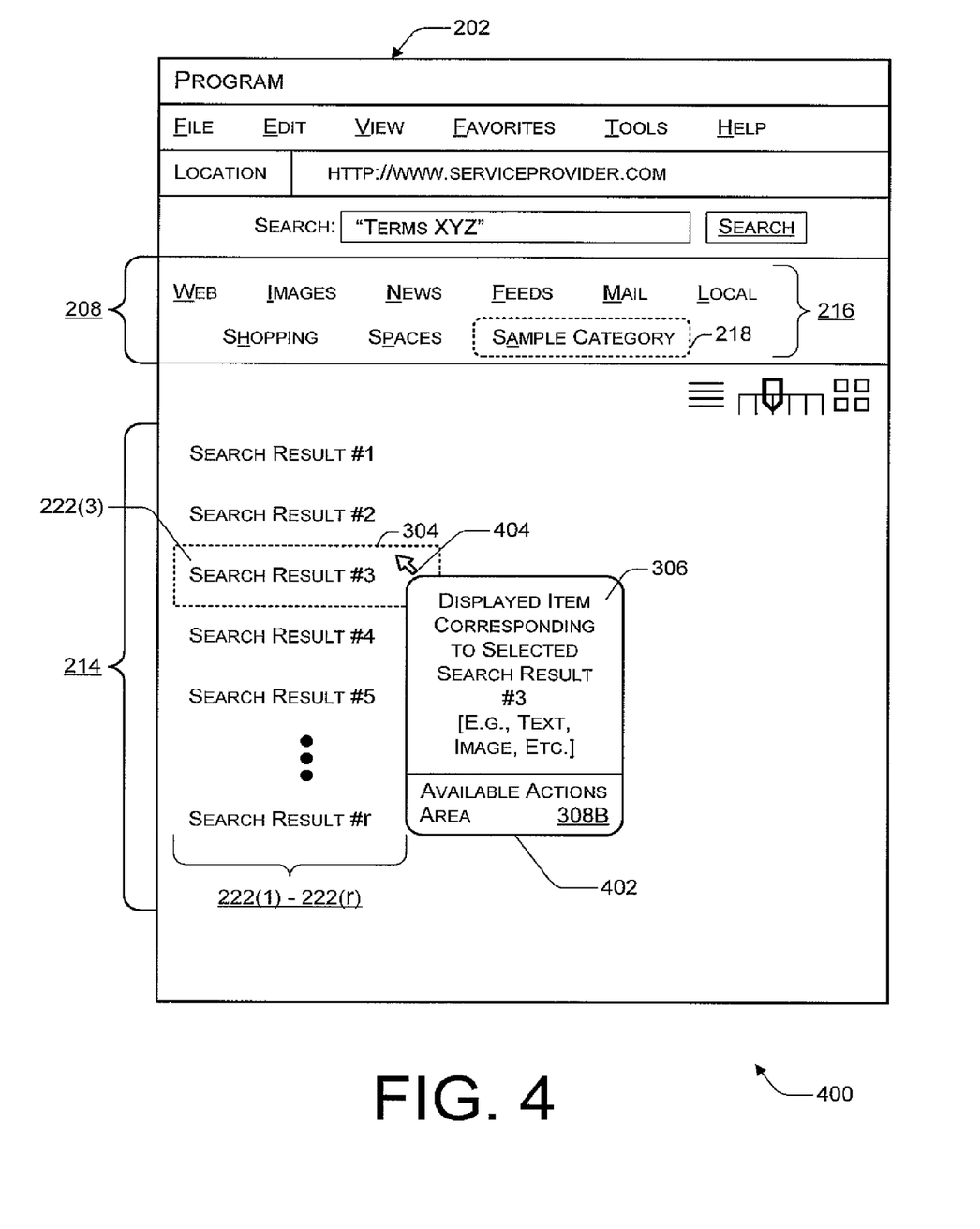
FIG. 4 is an example user interface in which a highlighted search result is previewed within a pop-up overlay presenting available actions.

FIG. 4 is an example user interface 400 in which a highlighted search result 222(3) is previewed within a pop-up overlay 402 that presents available actions 308B. As illustrated, UI 400 includes a pointer icon 404 that may be manipulated by a mouse, track-ball, joystick, or similar. Although it is represented by an arrow, pointer icon 404 may alternatively be represented by a different icon, such as one connoting a search or preview function.

In UI 400, a user 116 has selected search result #3 222(3) as represented by selection highlighted indicator 304. Although other mechanisms such as keyboarding and pointing-and-clicking may be employed, in his example selection of a search result 222 has been effectuated based on proximity with pointer icon 404. More specifically, selection may be effected merely by roll-over of a search result 222 by pointer icon 404. (Roll-over by pointer icon 404 may also be used to select a category 216.)

When previewing search results 222 with a pop-up overlay, pop-up overlay 402 is displayed as part of UI 400 upon selection of a search result 222. In UI 400, pop-up overlay 402 is displayed as touching or at least proximate to the selected search result 222(3), but another location within program window 202 may alternatively be chosen.

In a described implementation, pop-up overlay 402 includes a displayed preview of the item 306 corresponding to the selected search result #3. Pop-up overlay 402 also includes an available actions area 308B that presents actions that may be initiated by a user 116 for performance with respect to the displayed item 306. The actions of available actions area 308B are based on the category 216 that is selected in category area 208 as represented by selection highlighted indicator 218. In other words, the actions in available actions area 308A for pane 302 may be the same as the actions in available actions area 308B for pop-up overlay 402 if the selected category is the same.

Figure 5:
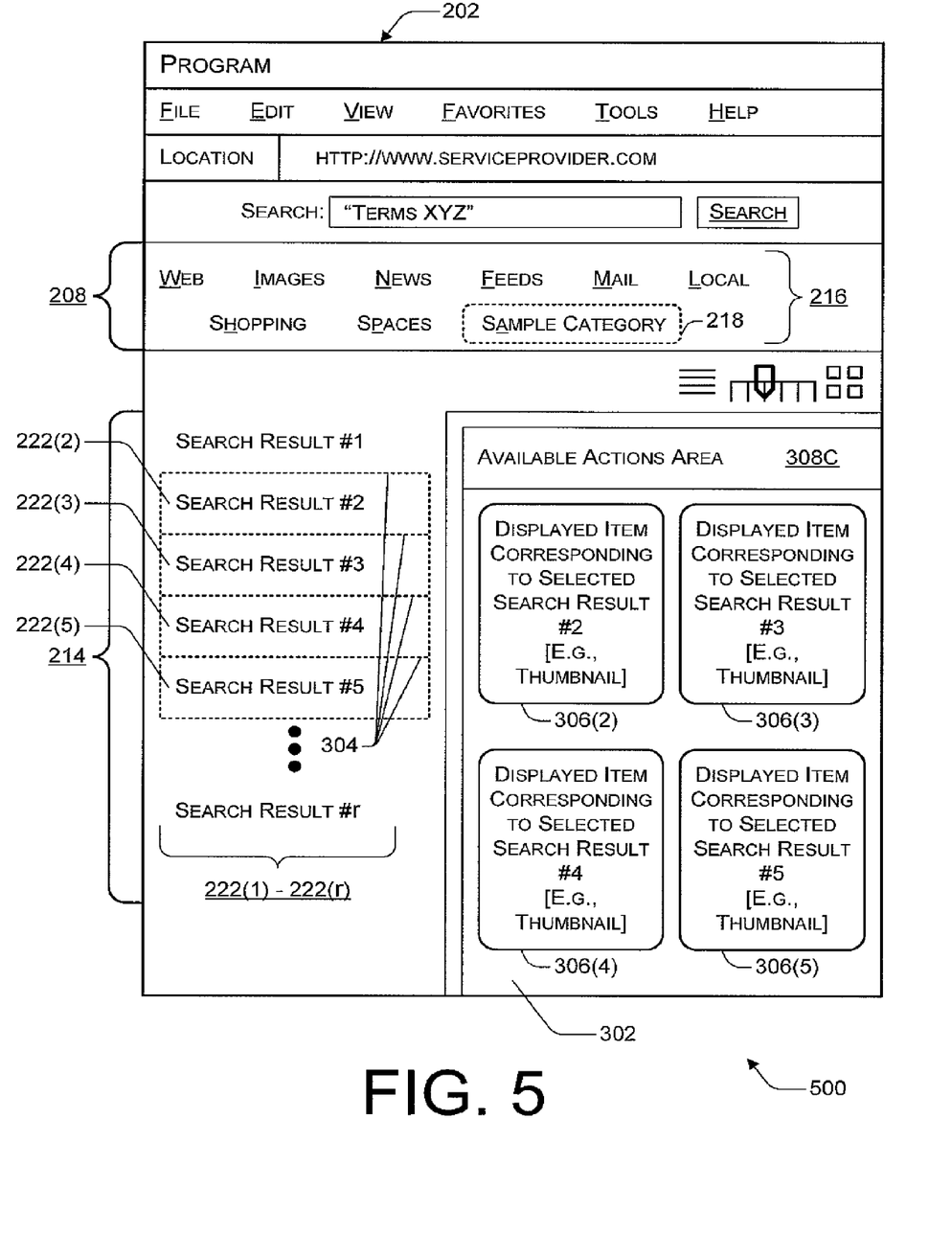
FIG. 5 is an example user interface in which multiple highlighted search results are previewed within a pane in proximity to available actions.

FIG. 5 is an example UI 500 in which multiple highlighted search results 222(2)-222(5) are previewed within pane 302 in proximity to available actions 308C. In UI 500, a user 116 has selected "Sample Category" 216 from category area 208 as represented by selection highlighted indicator 218. After inputting the search terms "Terms XYZ" and conducting a search with them in conjunction with the selected category, "r" search results 222(1)-222(r) are produced in search results area 214. In UI 500, user 116 has selected four search results 222. Specifically, search result #2 222(2), search result #3 222(3), search result #4 222(4), and search result #5 222(5) have been selected as represented by the selection highlighted indicator 304.

These four selected search results #2-#5 222(2)-222(5) are reflected in pane 302. The four items 306(2), 306(3), 306(4), and 306(5) that correspond to the four selected search results 222(2), 222(3), 222(4), and 222(5), respectively, are displayed in pane 302. In this example, when multiple items 306 are previewed in pane 302, each item 306 is displayed in a thumbnail format. However, other display formats may alternatively be used.

An available actions area 308C is also presented. The actions of available actions area 308C are based on the selected category 216. Hence, in the example of UI 500, the actions of available actions area 308C depend on which actions are relevant for items that are found from a search of the selected "Sample Category" 216.

The available actions in available actions area 308C may be adjusted as compared to those of available actions area 308A or 308B because certain actions may not be simultaneously applicable to the multiple items 306(2)-306(5) that are previewed in pane 302. However, for those actions that are simultaneously applicable to the multiple items 306(2)-306(5) that are previewed in pane 302, initiation of an action from available actions area 308C by a user 116 causes the initiated action to be performed with respect to each of the multiple items 306(2)-306(5). For example, for four web page items 306 that are displayed in pane 302, the initiation of a bookmarking action causes all four web page items 306 to be added to a favorites folder.

Figure 6:
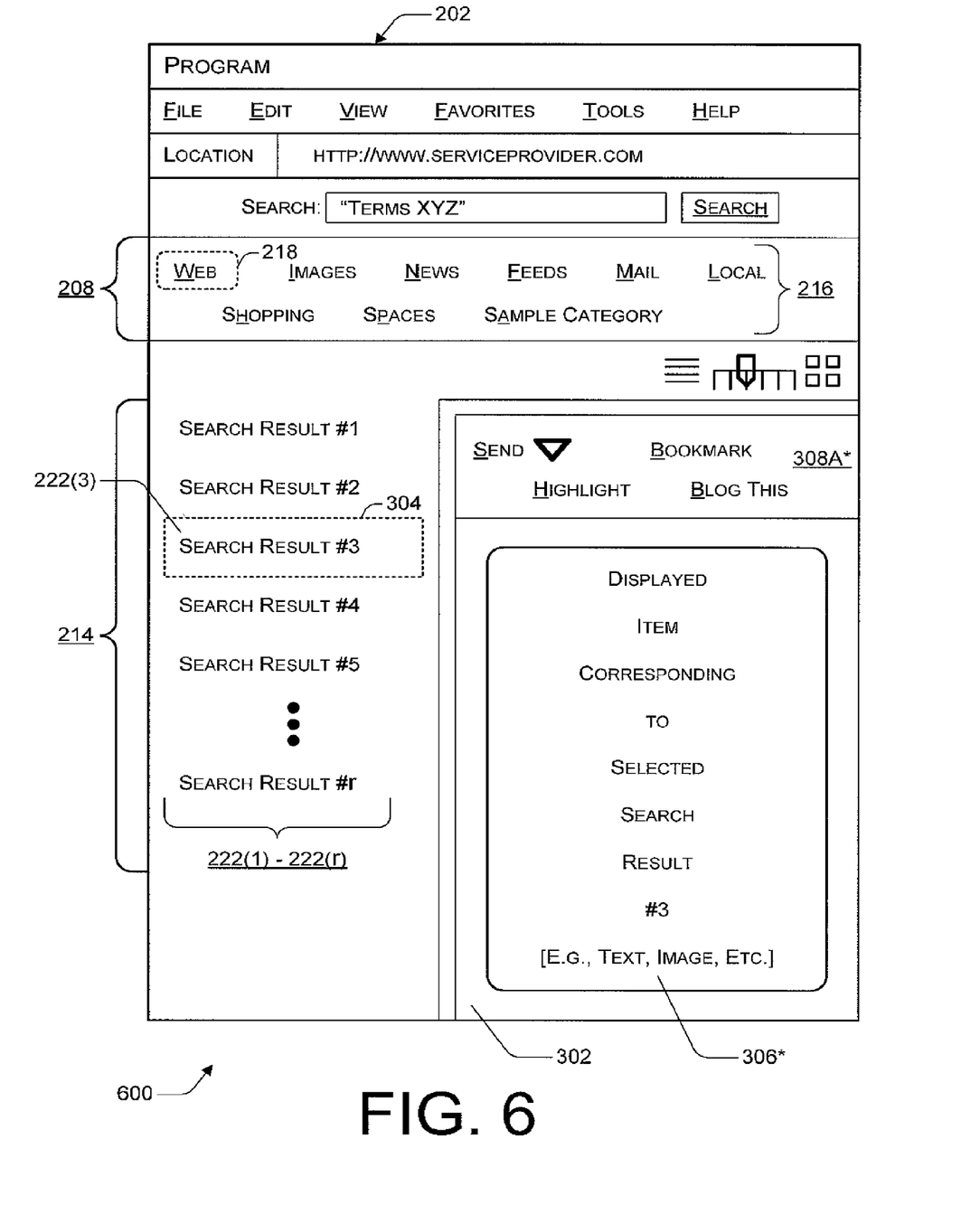
FIG. 6 is an example user interface in which a highlighted search result is previewed within a pane in proximity to specific example available actions that are associated with a web category.

FIG. 6 is an example UI 600 in which a highlighted search result 222(3) is previewed within a pane 302 in proximity to specific example available actions in available actions area 308A* that are associated with a web category 216. UI 600 is similar to UI 300 (of FIG. 3). However, the selected category 216 in UI 600 is a web category 216 as represented by selection highlighted indicator 218. Consequently, item 306* is an item that is found under the web category 216 (e.g., it may be a web page).

Accordingly, the illustrated actions of available actions area 308A* are specifically related to items pertaining to the web. The illustrated example actions include: send, bookmark, highlight, and blog this. As represented in UI 600 by the downward-pointing triangular symbol, additional options can be made available to user 116 that relate to sending the previewed item 306*. In this case, the additional options may relate to a destination and/or a mode for sending the previewed item 306*.

The presented actions of the available actions areas 308 may be presented visually as a drop-down menu, as pressable buttons, as some combination thereof, and so forth. Each action may be represented with text and/or an icon.

Figure 7:
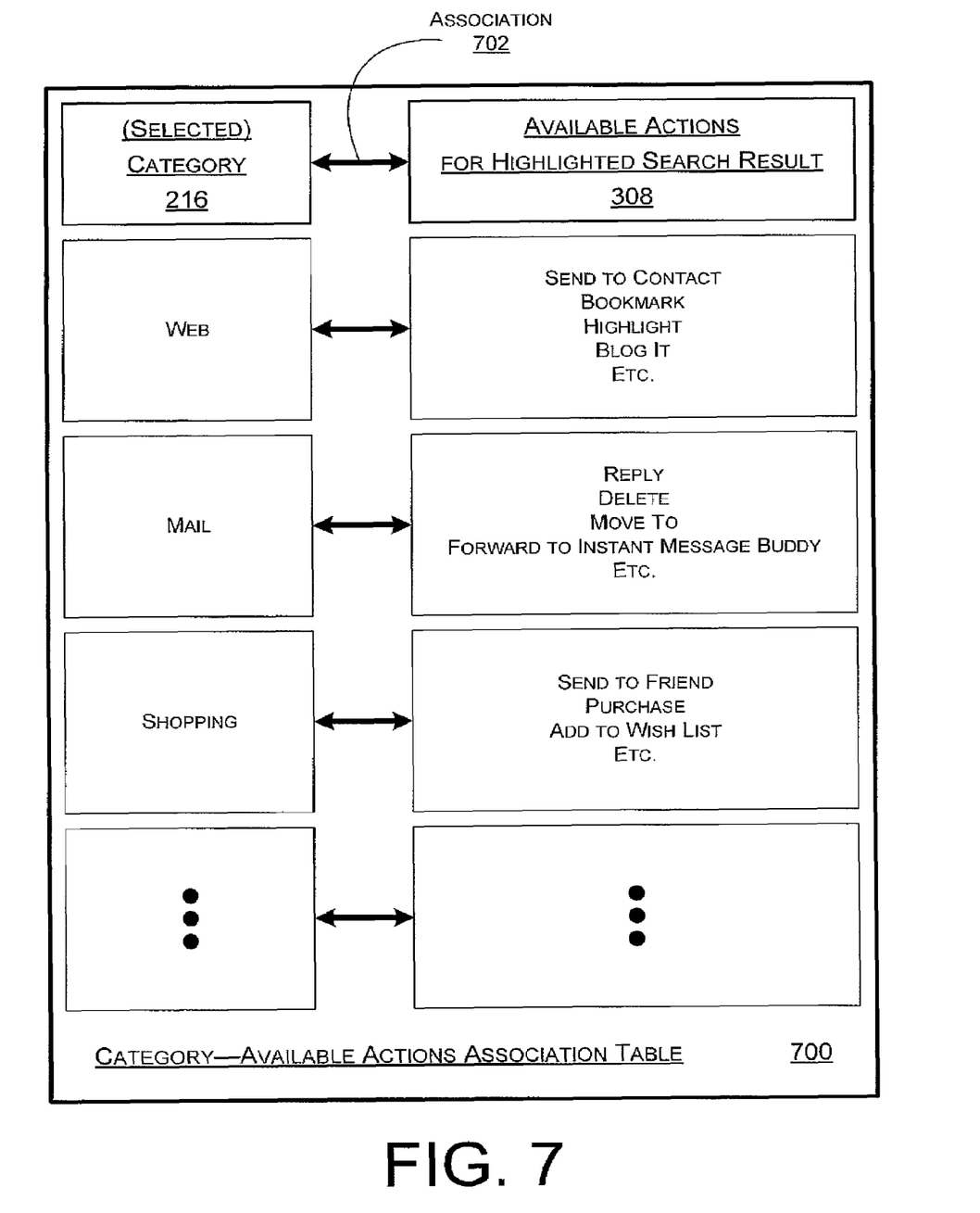
FIG. 7 is an example table in which respective categories are associated with respective available actions that may be initiated for a highlighted search result.

FIG. 7 is an example table 700 in which respective categories 216 are associated with respective available actions 308 that may be initiated for a highlighted search result. As described herein, the available actions for available actions area 308 that are presented in a search-oriented UI are based on a selected category 216. Table 700 stores associations 702 between categories 216 and available actions 308 for highlighted search result(s). Table 700 may be a separate processor-accessible data structure or may be part of service provider module 108 and/or UI module 110.

Table 700 stores associations 702 for one or more categories 216. Table 700 specifically includes examples for a web category, a mail category, and a shopping category. The associated available actions 308 for a selected web category 216 are: send to contact, bookmark, highlight, blog it, and so forth. The associated available actions 308 for a selected mail category 216 are: reply, delete, move to, forward to instant message buddy, and so forth. The associated available actions 308 for a selected shopping category 216 are: send to friend, purchase, add to wish list and so forth.

Figure 8:
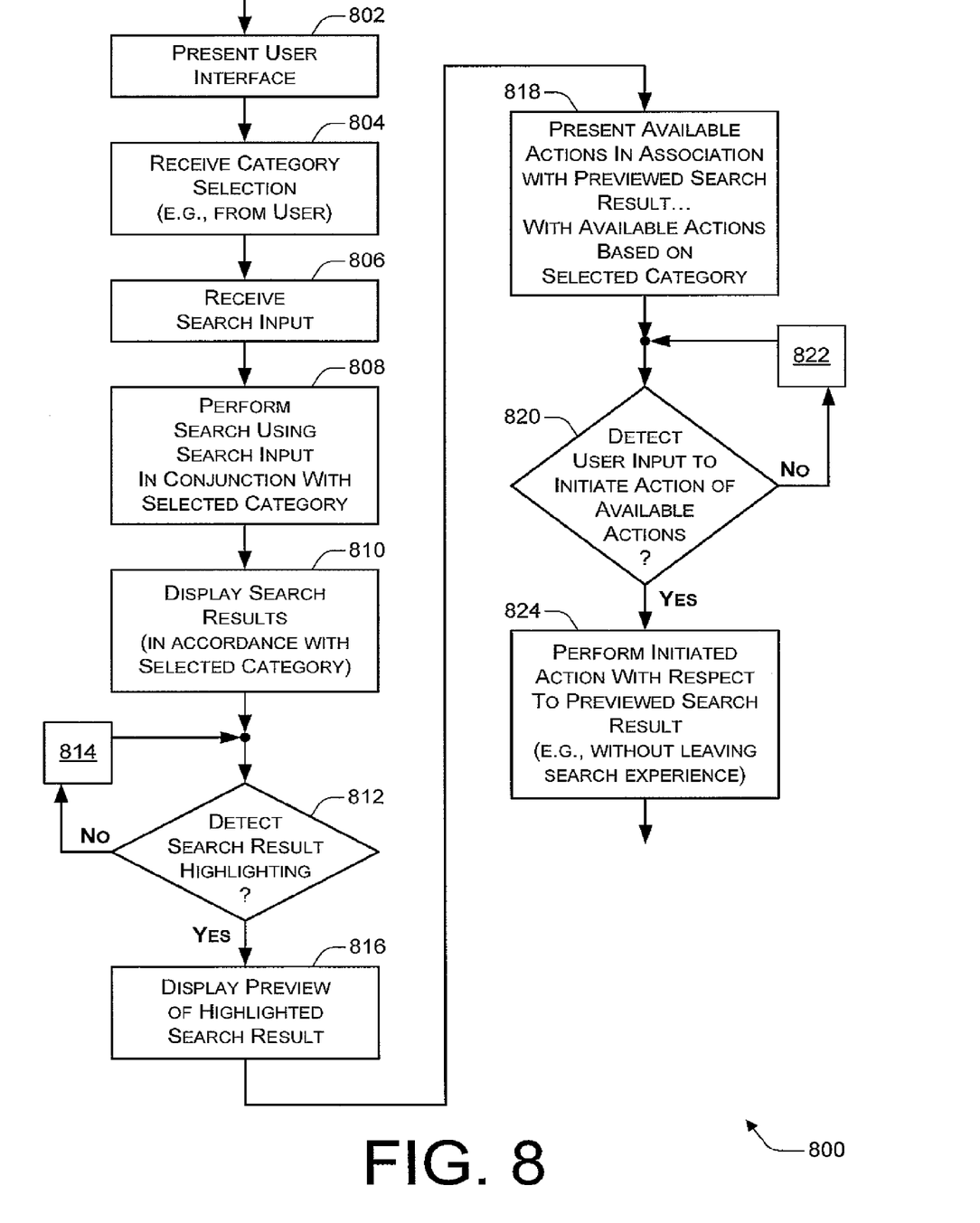
FIG. 8 is a flow diagram that illustrates an example of a method for viewing search results and presenting available actions that are category-dependent.

FIG. 8 is a flow diagram 800 that illustrates an example of a method for viewing search results and presenting available actions that are category-dependent. Flow diagram 800 includes twelve (12) blocks 802-824. Although the actions of flow diagram 800 may be performed in other environments and with a variety of hardware and software combinations, a service provider module 108 and a UI module 110, either separately or jointly, may be used to implement the method of flow diagram 800 with a UI.

At block 802, a UI is presented. For example, a UI 200 may be presented to a user 116. At block 804, a category selection is received. The initial category selection may be from user 116 or a programmatically based on a default initial selection. For example, a category 216 may be selected as represented by selection highlighted indicator 218.

At block 806, a search input is received. For example, search terms may be received at a search input area 210. At block 808, the search is performed using the search input in conjunction with the selected category. For example, the input search terms may be applied to a database and/or index of data that is directed to the selected category. At block 810, the search results are displayed. For example, search results 222 in accordance with the selected category 216 may be displayed in a search results area 214.

At block 812, it is detected if a search result is highlighted. For example, it may be detected if at least one search result 222 is highlighted by user 116 as represented by selection highlighted indicator 304. If not, then at block 814 the operational module can determine if the search input is changed or if the selected category is changed. Either change can cause a different set of search results 222 to be displayed. Otherwise, the operational module continues to await detection of highlighting of a search result (at block 812).

If, on the other hand, it is detected that a search result is highlighted (at block 812), then at block 816 a preview of the highlighted search result is displayed. For example, a preview of an item 306 corresponding to a highlighted search result 222 may be displayed in a pane 302, or in a pop-up overlay 402, or in another display format.

At block 818, available actions are presented in association with the previewed search result, with the available actions being based on the selected category. For example, category-dependent actions may be presented in available actions area 308 for a pane 302, or a pop-up overlay 402, and so forth.

At block 820, it is detected if user input initiates an action of the presented available actions. If not, then at block 822 the operational module continues monitoring for changes to the search input, the selected category, the highlighted search result(s), and so forth. Possible detection of action initiation at block 820 is also continued.

If, on the other hand, user initiation of an action is detected (at block 820), then at block 824 the initiated action is performed with respect to the previewed search result. For example, the initiated action may be performed with respect to the previewed item 306 without forcing the user to leave the search experience.

Example Device Implementations for Viewable and Actionable Search Results

Figure 9:
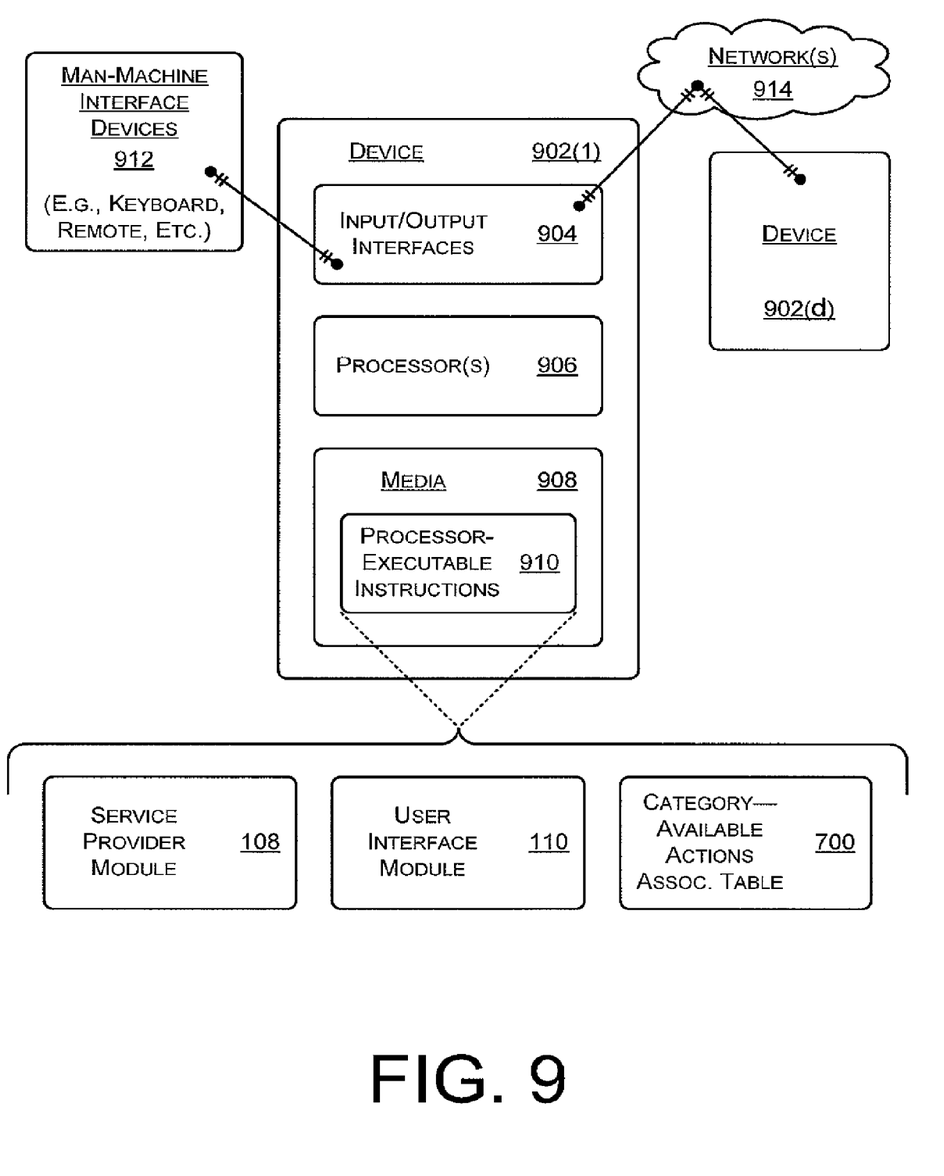
FIG. 9 is a block diagram of an example device that may be employed in conjunction with viewable and actionable search results.

FIG. 9 is a block diagram of an example device 902 that may be employed in conjunction with viewable and actionable search results. For example, a device 902 may realize, execute, or otherwise implement a UI as described herein above. In certain implementations, devices 902 are capable of communicating across one or more networks 914, such as network 104. As illustrated, two devices 902(1) and 902(d) are capable of engaging in communication exchanges via network 914. Example relevant communication exchanges include those between a server 102 and a client 106 relating to providing services 112.

Generally, device 902 may represent a server or a client device; a storage device; a workstation or other general computer device; a set-top box or other television device; a personal digital assistant (PDA), mobile telephone, or other mobile appliance; some combination thereof; and so forth. As illustrated, device 902 includes one or more input/output (I/O) interfaces 904, at least one processor 906, and one or more media 908. Media 908 includes processor-executable instructions 910. Although not specifically illustrated, device 902 may also include other components.

In a described implementation of device 902, I/O interfaces 904 may include (i) a network interface for communicating across network(s) 914, (ii) a display device interface for displaying information on a display screen, (iii) one or more man-machine device interfaces, and so forth. Examples of (i) network interfaces include a network card, a modem, one or more ports, and so forth. Examples of (ii) display device interfaces include a graphics driver, a graphics card, a hardware or software driver for a screen/television or printer, etc. to create a UI. Examples of (iii) man-machine device interfaces include those that communicate by wire or wirelessly to man-machine interface devices 912 (e.g., a keyboard or keypad, a mouse or other graphical pointing device, a remote control, etc.) to manipulate and interact with a UI.

Generally, processor 906 is capable of executing, performing, and/or otherwise effectuating processor-executable instructions, such as processor-executable instructions 910. Media 908 is comprised of one or more processor-accessible media. In other words, media 908 may include processor-executable instructions 910 that are executable by processor 906 to effectuate the performance of functions by device 902.

Thus, realizations for viewable and actionable search results may be described in the general context of processor-executable instructions. Generally, processor-executable instructions include routines, programs, applications, coding, modules, protocols, objects, interfaces, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 906 may be implemented using any applicable processing-capable technology. Media 908 may be any available media that is included as part of and/or accessible by device 902. It includes volatile and non-volatile media, removable and non-removable media, and storage and transmission media (e.g., wireless or wired communication channels). For example, media 908 may include an array of disks for longer-term mass storage of processor-executable instructions, random access memory (RAM) for shorter-term storage of instructions that are currently being executed, flash memory for medium to longer term storage, optical disks for portable storage, and/or link(s) on network 914 for transmitting code or other communications, and so forth.

As specifically illustrated, media 908 comprises at least processor-executable instructions 910. Generally, processor-executable instructions 910, when executed by processor 906, enable device 902 to perform the various functions described herein. Examples include, but are not limited to, those functions of a service provider module 108 and/or a UI module 110 (of FIG. 1); those enabled by a category-to-available actions association table 700 (of FIG. 7); those exhibited by UIs 200, 300, 400, 500, and 600 (of FIGS. 2, 3, 4, 5, and 6, respectively); some combination thereof; and so forth.

The devices, actions, aspects, features, functions, procedures, modules, data structures, schemes, approaches, UIs, architectures, components, etc. of FIGS. 1-9 are illustrated in diagrams that are divided into multiple blocks. However, the order, interconnections, interrelationships, layout, etc. in which FIGS. 1-9 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for viewable and actionable search results.

Although systems, media, devices, methods, procedures, apparatuses, techniques, schemes, approaches, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. One or more processor-accessible storage media comprising processor-executable instructions that, when executed, cause a device to display a user interface, the user interface comprising:
   a search results area that includes multiple search results;
   a category area that identifies multiple categories, each category of the multiple categories capable of being selected;
   a preview area that includes a preview of at least one search result of the multiple search results; and
   an available actions area that indicates one or more actions that may be performed with respect to the previewed at least one search result;
   wherein the indicated one or more actions are based on a selected category of the multiple categories, and
   wherein the indicated one or more actions of the available actions area are changed when a user changes the selected category of the multiple categories.

2. The one or more processor-accessible storage media as recited in claim 1, wherein the processor-executable instructions prescribe actions for at least one of a server device and a client device.

3. The one or more processor-accessible storage media as recited in claim 1, wherein the preview area comprises a preview pane that displays the previewed at least one search result.

4. The one or more processor-accessible storage media as recited in claim 3, wherein the available actions area is part of or proximate to the preview pane.

5. The one or more processor-accessible storage media as recited in claim 1, wherein the preview area comprises a pop-up overlay that displays the previewed at least one search result.

6. The one or more processor-accessible storage media as recited in claim 5, wherein the available actions area comprises a part of the pop-up overlay and is presented when the pop-up overlay is displayed.

7. The one or more processor-accessible storage media as recited in claim 1, wherein the multiple search results are changed when a user changes the selected category of the multiple categories.

8. The one or more processor-accessible storage media as recited in claim 1, wherein the user interface further comprises: an information depth selector that sets an amount of information displayed for each search result of the multiple search results.

9. A method comprising:
   displaying multiple search results, by a computing device configured to provide viewable and actionable search results, in accordance with a selected category;
   detecting, by the computing device, user selection of a plurality of search results of the multiple search results;
   displaying, by the computing device, a preview of the selected plurality of search results by displaying a thumbnail preview for each search result of the selected plurality of search results;
   presenting, by the computing device, available actions in association with the previewed plurality of search results, the available actions based on the selected category, wherein each of the plurality of search results are associated with a plurality of respective actions, the available actions including actions that are applicable to each of the plurality of search results, and at least one action applicable to a particular search result is not included in the available actions;
   detecting, by the computing device, that a new category has been selected; and
   in response to the detecting that a new category has been selected, presenting, by the computing device, new available actions in association with the plurality of search results, the new available actions based on the newly selected category.

10. The method as recited in claim 9, further comprising:
    receiving user input, by the computing device, to initiate an action of the available actions; and
    performing, by the computing device, the initiated action with respect to each of the previewed plurality of search results.

11. The method as recited in claim 9, wherein:
    the displaying a preview of the selected plurality of search results comprises displaying the previewed plurality of search results in a pane; and
    the presenting available actions in association with the previewed plurality of search results comprises presenting the available actions within the pane or in proximity to the pane.

12. The method as recited in claim 9, wherein:
    the displaying a preview of the selected plurality of search results comprises displaying the previewed plurality of search results in a pop-up overlay; and
    the presenting available actions in association with the previewed plurality of search results comprises presenting the available actions within the pop-up overlay.

13. The method as recited in claim 9, further comprising:
    detecting, by the computing device, that an information depth selector has been adjusted; and
    in response to the detecting that an information depth selector has been adjusted, redisplaying, by the computing device, the multiple search results in a format having a different amount of information for each search result of the multiple search results.

14. A device comprising:
    at least one processor; and
    one or more processor-accessible media that include a module to facilitate creation of a user interface for a search environment,
    wherein the user interface enables a user to select a category and to cause a search to be performed with regard to the selected category, the user interface including a plurality of selectable categories,
    wherein the user interface presents actions that are available for initiation by the user for performance with respect to at least one selected search result,
    wherein the module includes a data structure that associates respective categories with respective sets of available actions that are respectively presented as part of the user interface when a respective category is selected by a user such that the actions that are presented by the user interface are dependent on the selected category, and
    wherein the module is executable by the processor to:
      receive search terms via a search input area of the user interface;
      provide search results according to the search terms and the selected category;
      receive an indication of selection of an additional category via the user interface; and
      provide additional search results in response to receiving the indication of selection of the additional category, wherein the additional search results are based on the search terms and the additional category.

15. The device as recited in claim 14, wherein the module enables the user to initiate the actions that are performed with respect to the at least one selected search result without leaving the search environment.

16. One or more processor-accessible storage media comprising processor-executable instructions that, when executed, cause a device to display a user interface, the user interface comprising:
   a search results area that includes multiple selectable search results;
   a category area that identifies multiple categories, each category of the multiple categories capable of being selected;
   a preview area that includes a preview of at least one selected search result of the multiple selectable search results; and
   an available actions area that indicates one or more actions that may be performed with respect to the previewed at least one selected search result;
   wherein the indicated one or more actions are based on a selected category of the multiple categories according to a data structure that associates respective categories with respective one or more actions, the respective one or more actions for presentation as part of the user interface upon selection of a respective category of the multiple categories.

17. The one or more processor-accessible storage media of claim 16 wherein the data structure is separate from at least one of a service provider module and a user interface module.

18. The one or more processor-accessible storage media of claim 16 wherein the data structure is a part of a service provider module.

19. The one or more processor-accessible storage media of claim 16 wherein the data structure is a part of a user interface module.

20. The one or more processor-accessible storage media of claim 16 wherein the multiple categories comprise at least one category selected from a group consisting of a web category, a mail category and a shopping category.

21. The one or more processor-accessible storage media of claim 16 wherein the user interface provides for highlighting one or more search results in the search results area to thereby select one or more of the search results for preview in the preview area.

22. One or more processor-accessible storage media comprising processor-executable instructions that, when executed, cause a device to display a user interface, the user interface comprising:
   a search results area that includes multiple highlightable search results, wherein the multiple highlightable search results include web pages;
   a category area that identifies multiple categories, each category of the multiple categories capable of being selected; and
   an available actions area that indicates one or more actions that may be performed with respect to a highlighted search result;
   wherein the indicated one or more actions are based on a selected category of the multiple categories according to a data structure that associates respective categories with respective one or more actions, the respective one or more actions for presentation as part of the user interface upon selection of a respective category of the multiple categories and upon highlighting a search result.

23. The one or more processor-accessible storage media of claim 22 wherein the data structure is separate from at least one of a service provider module and a user interface module.

24. The one or more processor-accessible storage media of claim 22 wherein the data structure is a part of a service provider module.

25. The one or more processor-accessible storage media of claim 22 wherein the data structure is a part of a user interface module.

26. The one or more processor-accessible storage media of claim 22 wherein the multiple categories comprise at least one category selected from a group consisting of a web category, a mail category and a shopping category.

27. The one or more processor-accessible storage media of claim 22 wherein the user interface provides for highlighting one or more search results in the search results area to thereby select one or more of the search results for preview in the preview area.

* * * * *